US008856340B2

(12) United States Patent
Cardona et al.

(10) Patent No.: US 8,856,340 B2
(45) Date of Patent: *Oct. 7, 2014

(54) MULTI-ADAPTER LINK AGGREGATION FOR ADAPTERS WITH HARDWARE BASED VIRTUAL BRIDGES

(75) Inventors: Omar Cardona, Cedar Park, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/447,605

(22) Filed: Apr. 16, 2012

(65) Prior Publication Data

US 2012/0201253 A1 Aug. 9, 2012

Related U.S. Application Data

(63) Continuation of application No. 12/908,545, filed on Oct. 20, 2010.

(51) Int. Cl.
*G06F 15/173* (2006.01)
*G06F 15/177* (2006.01)
*G06F 9/455* (2006.01)

(52) U.S. Cl.
CPC .. *G06F 9/45558* (2013.01); *G06F 2009/45595* (2013.01)
USPC .............................. 709/226; 718/1; 709/220

(58) Field of Classification Search
USPC ....................... 709/220, 226; 718/1
See application file for complete search history.

(56) References Cited

U.S. PATENT DOCUMENTS

| 6,163,543 | A  | 12/2000 | Chin et al. |
| 6,631,141 | B1 | 10/2003 | Kumar et al. |
| 7,023,797 | B2 | 4/2006  | Tagore-Brage |
| 7,145,866 | B1 | 12/2006 | Ting et al. |
| 7,529,180 | B1 | 5/2009  | Karl et al. |
| 7,684,410 | B2 | 3/2010  | Wackerly |
| 2003/0147387 | A1 | 8/2003  | Devi et al. |
| 2003/0208551 | A1 | 11/2003 | Matters et al. |
| 2004/0098501 | A1 | 5/2004  | Finn |

(Continued)

FOREIGN PATENT DOCUMENTS

| EP | 1624638 A1 | 2/2006 |
| WO | WO 2008/064105 A2 | 5/2008 |

OTHER PUBLICATIONS

Office Action mailed May 2, 2013 for U.S. Appl. No. 12/908,545; 11 pages.

(Continued)

*Primary Examiner* — Jeong S Park
(74) *Attorney, Agent, or Firm* — Stephen J. Walder, Jr.; Parashos T. Kalaitzis

(57) ABSTRACT

Mechanisms for providing a network adapter and functionality for performing link aggregation within a network adapter are provided. With these mechanisms, a network adapter is provided that includes a plurality of physical network ports for coupling to one or more switches of a data network and a link aggregation module, within the network adapter, and coupled to the plurality of physical network ports. The link aggregation module comprises logic for aggregating links associated with the plurality of physical network ports into a single virtual link. The link aggregation module interfaces with a virtual Ethernet bridge (VEB) of the network adapter to send data to the VEB and receive data from the VEB.

11 Claims, 7 Drawing Sheets

(56) References Cited

U.S. PATENT DOCUMENTS

| | | | |
|---|---|---|---|
| 2007/0002826 A1 | 1/2007 | Bennett et al. | |
| 2007/0058602 A1 | 3/2007 | Shimada | |
| 2007/0260910 A1 | 11/2007 | Jain et al. | |
| 2008/0080544 A1 | 4/2008 | Mani et al. | |
| 2008/0215910 A1 | 9/2008 | Gabriel et al. | |
| 2008/0310421 A1 | 12/2008 | Teisberg et al. | |
| 2009/0109998 A1 | 4/2009 | Vinayagam et al. | |
| 2010/0115174 A1* | 5/2010 | Akyol et al. | 710/316 |
| 2010/0124271 A1 | 5/2010 | Martz et al. | |
| 2011/0032944 A1* | 2/2011 | Elzur et al. | 370/395.53 |
| 2011/0103396 A1 | 5/2011 | Cardona et al. | |
| 2012/0016970 A1* | 1/2012 | Shah et al. | 709/220 |
| 2012/0102217 A1* | 4/2012 | Cardona et al. | 709/235 |

OTHER PUBLICATIONS

Interview Summary mailed Feb. 22, 2013 for U.S. Appl. No. 12/908,545; 3 pages.

Office Action mailed Sep. 20, 2012 for U.S. Appl. No. 12/608,620; 30 pages.

Preliminary Amendment filed with the USPTO on Apr. 16, 2012 for U.S. Appl. No. 12/908,545, 6 pages.

Preliminary Amendment filed with the USPTO on Apr. 24, 2012 for U.S. Appl. No. 12/608,620, 9 pages.

Response to Office Action filed with the USPTO on Dec. 12, 2012 for U.S. Appl. No. 12/608,620, 14 pages.

Author Unknown, "IEEE 802.1Q Standard", 2003, pp. 1-312.

Office Action dated Nov. 20, 2012 for U.S. Appl. No, 12/908,545; 12 pages.

Response to Office Action filed with the USPTO on Feb. 19, 2013 for U.S. Appl. No. 12/908,545, 17 pages.

USPTO U.S. Appl. No. 12/608,620, Image File Wrapper printed from PAIR on Apr. 16, 2012, 1 page.

USPTO U.S. Appl. No. 12/908,545, Image File Wrapper printed Apr. 16, 2012, 1 page.

Watanabe, Takafumi et al., "Impact of Topology and Link Aggregation on a PC Cluster with Ethernet", IEEE International Conference on Cluster Computer, 2008, pp. 280-285.

Office Action railed May 2, 2013 for U.S. Appl. No. 12,908,545; 11 pages.

Response to Office Action filed with the USPTO on Jul. 31, 2013 for U.S. Appl. No. 12/908,545, 19 pages.

Merchant, Shehzad, "VEPA: An Answer to Virtual Switching", Network World, Dec. 23, 2010, 3 pages.

\* cited by examiner

MULTI-ADAPTER LINK AGGREGATION FOR ADAPTERS WITH HARDWARE BASED VIRTUAL BRIDGES

This application is a continuation of application Ser. No. 12/908,545, filed Oct. 20, 2010, status pending.

BACKGROUND

The present application relates generally to an improved data processing apparatus and method and more specifically to mechanisms for providing multi-adapter link aggregation for adapters with hardware based virtual bridges.

Modern data processing systems can be divided into logical partitions (LPARs) where a logical partition, or simply a "partition," operates as a virtually separate data processing system independent of the other logical partitions in the data processing system. Generally, partition management firmware connects the various partitions and provides the network connectivity among them. A hypervisor is an example of one type of partition management firmware.

Partitions may access data networks over more than one data communication paths, also known as links. A link typically facilitates data communication between an input/output (I/O) adapter and a data port, such as a port on a network switch, i.e. a device that facilitates data communication between two or more data processing systems or components thereof. A common variety of switches enables multiple data processing systems and networking capable data processing system components to communicate with each other, with a data network, or both.

A partition utilizing multiple links to communicate with a network may use multiple I/O adapters or multiple ports on an I/O adapter to communicate with multiple corresponding ports on a switch. Each I/O adapter port communicates with a port on a switch. An I/O adapter port is a point of ingress and egress of data to and from the I/O adapter. Similarly, a port on a switch is a point of ingress and egress of data to and from the switch.

Multiple links can be logically grouped together so that they appear to a partition and a switch as a communication channel of multiple links between the partition and the switch. The communication channel hides the individual I/O adapters or I/O adapter ports from the applications, executing in the partitions, that use those adapters for data communication. In this way, data communication from the applications can be serviced by any of the I/O adapter ports participating in the communication channel. A group of multiple links operating as a communication channel in this manner is called referred to as a link aggregation channel.

The most common way in which link aggregation is performed is to use the Link Aggregation Control Protocol (LACP). LACP is a protocol established by the IEEE as a method to control the bundling of several physical ports together to form a single logical channel. LACP allows an operating system of a network device to negotiate an automatic bundling of links by sending LACP packets to the peer (directly connected device that also implements LACP). LACP works by sending frames (LACPDUs) down all links that have the protocol enabled. If the sending device finds another device on the other end of the link that also has LACP enabled, the other device will also independently send frames along the same links enabling the two devices to detect multiple links between themselves and then combine them into a single logical link. It should be noted that this link aggregation is performed at an operating system level.

SUMMARY

In one illustrative embodiment, a method, in a network adapter, is provided for processing traffic. The method comprises receiving traffic in the network adapter from either a host system or an external data network. The method further comprises providing the traffic to a link aggregation module of the network adapter, either via a virtual Ethernet bridge (VEB) or a physical network port, in a plurality of physical network ports, of the network adapter. Moreover, the method comprises determining a route for the traffic either to a virtual function of the network adapter or a physical network port of the adapter based on a link aggregation data structure maintained by the link aggregation module of the network adapter. In addition, the method comprises routing the traffic to either the virtual function or the physical network port based on the determined route.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, mechanisms for providing a network adapter and functionality for performing link aggregation within a network adapter are provided. With these mechanisms, a network adapter is provided that includes a plurality of physical network ports for coupling to one or more switches of a data network and a link aggregation module, within the network adapter, and coupled to the plurality of physical network ports. The link aggregation module comprises logic for aggregating links associated with the plurality of physical network ports into a single virtual link. The link aggregation module interfaces with a virtual Ethernet bridge (VEB) of the network adapter to send data to the VEB and receive data from the VEB.

In still another illustrative embodiment, a data processing system is provided that comprises a host system having one or more logical partitions, and a network adapter coupled to the host system. The network adapter comprises a plurality of physical network ports for coupling to one or more switches of a data network and a link aggregation module, within the network adapter, and coupled to the plurality of physical network ports. The link aggregation module comprises logic for aggregating links associated with the plurality of physical network ports into a single virtual link. The link aggregation module interfaces with a virtual Ethernet bridge (VEB) of the network adapter to send data to the VEB and receive data from the VEB.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
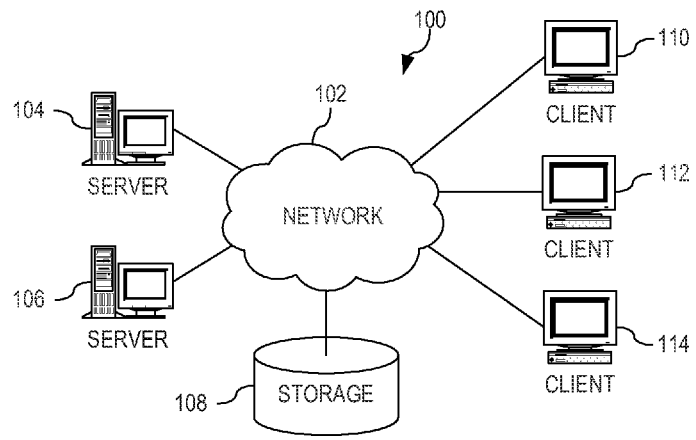
FIG. 1 is an example distributed data processing system in which aspects of the illustrative embodiments may be implemented.

As input/output (I/O) adapter speeds and features evolve, hardware based I/O virtualization (IOV) is increasingly important to obtaining higher adapter utilization rates by allowing multiple operating system instances, such as in multiple logical partitions, to use the I/O adapter directly and concurrently. Unfortunately, the mechanisms for I/O adapter virtualization do not interoperate well with the Link Aggregation Control Protocol (LACP), i.e. the protocol typically used to perform link aggregation. This is because the LACP was designed to terminate at the operating system of the host system, whereas IOV introduces a virtual Ethernet bridge (VEB) which sits between the adapter physical port connected to the external switch and the adapter virtual function (VF) used by the operating system, i.e. the logical representation of the adapter with which the operating system instance of a logical partition communicates (virtual functions are described in the PCIe specification available from the PCI-SIG group and are generally known in the art). The VEB operates as a hardware switch, integrated in the adapter, that operates to route data to particular ports or VFs of an I/O adapter.

That is, LACP is meant to be a point-to-point protocol. By introducing a VEB in the adapter (which is for all effects a switch invisible to the external network and the VFs), the point-to-point concepts disappear. This gives rise to an N to 1 LACP exchange problem which forces all operating system instances, which are using an IOV enabled adapter, to configure their VF exactly the same so as to allow interoperability. This causes interoperability issues when LACP is used since, when multiple operating systems perform LACP configuration, the last operating system to configure the link group will overwrite the previous operating system settings, which is unacceptable from a reliability, availability, and serviceability (RAS) point of view. In other words, the operating systems of the logical partitions are distinct and separate and therefore, they are free to select/enforce independent LACP preferences. When this occurs, the last operating system to configure the VEB will effectively set the policies on the external switch, thus overwriting any prior operating system settings which may have been different. This results in an operating system of one logical partition impacting the expected operation of another logical partition which is unacceptable.

In addition, offloaded, state dependent, network connections, such as remote direct memory access (RDMA), Transport Control Protocol (TCP) offload, and the like, are not able to participate and take advantage of performance and availability features of link aggregation because the connection state resides in the adapter hardware logic and cannot be synchronized between separate physical IOV adapters. The current link aggregation protocols would require standards modifications to track individual LACP configuration transactions from each VF over an IOV adapter physical port and associate each source MAC with specific port profiles. This would lead to increased complexity and costs at the external switch layer.

The illustrative embodiments provide a mechanism for providing multi-adapter link aggregation for adapters with hardware based virtual bridges. The illustrative embodiments exploit the logic in IOV adapters to allow for LACP between multiple physical ports. Moreover, the illustrative embodiments layer a multi-adapter link aggregation solution on top of the VF interfaces using link aggregation protocols. Thus, with the mechanisms of the illustrative embodiments the responsibility for performing link aggregation operations is offloaded from the operating systems of the various logical partitions of the host system to the IOV adapter which is provided with additional hardware/firmware to perform link aggregation operations.

When compared to known manual link aggregation configuration approaches, the illustrative embodiments allow for LACP automated configuration within multiple physical ports on an IOV adapter and also present the aggregated group as a single interface VF to the operating system. The LACP negotiations are performed automatically by the IOV adapter and, as a result, the operating system is no longer an active participant on the setup operations. Thus, the problem where the last operating system to configure overwrites the previous operating system settings is avoided. Moreover, the IOV adapter firmware can perform the entirety of the LACP configuration on behalf of the operating systems, thereby providing increased bandwidth and link availability to offloaded/stateful connections (RDMA and TCP Offload Engine (ToE)) not currently available to operating system level aggregation interfaces.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
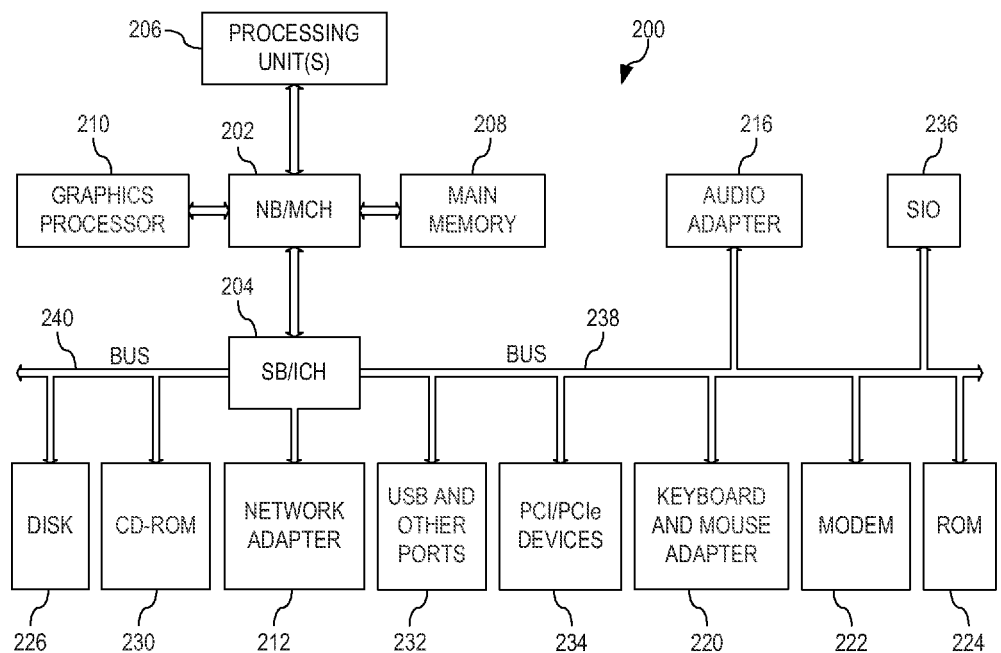
FIG. 2 is a block diagram of an example data processing system is shown in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
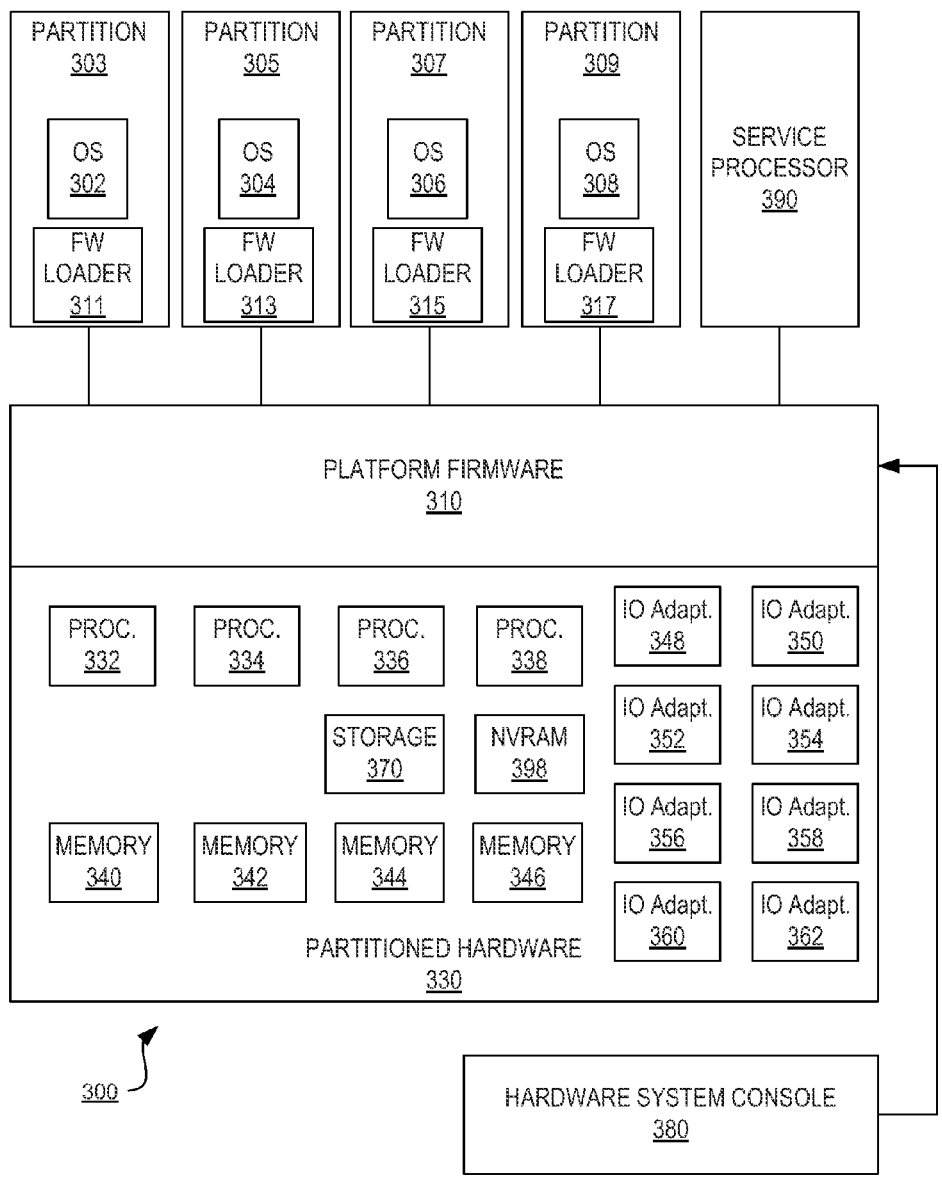
FIG. 3 is an example of a logically partitioned data processing system, or platform, in which aspects of the illustrative embodiments may be implemented.

It should be appreciated that the computing devices or data processing systems of the illustrative embodiments, e.g., data processing system 200 in FIG. 2, may be logically partitioned. FIG. 3 is an example of a logically partitioned data processing system, or platform, in which aspects of the illustrative embodiments may be implemented.

Logically partitioned platform 300 includes partitioned hardware 330, operating system instances 302, 304, 306, and 308, and platform firmware 310. A platform firmware, such as platform firmware 310, is also known as partition management firmware. Operating system images 302, 304, 306, and 308 may be multiple copies of a single operating system or multiple heterogeneous operating systems simultaneously executed on logically partitioned platform 300. The operating system images may be designed to interface with the partition management firmware, e.g., a hypervisor. Examples of the operating system images may include OS/400, AIX and Linux. Operating system images 302, 304, 306, and 308 are located in logical partitions 303, 305, 307, and 309.

Hypervisor software is an example of software that may be used to implement partition management firmware 310 and is available from International Business Machines Corporation of Armonk, N.Y. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (NVRAM).

Additionally, these partitions also include partition firmware 311, 313, 315, and 317. Partition firmware 311, 313, 315, and 317 may be implemented using initial boot strap code, IEEE-1275 standard open firmware, and runtime abstraction software (RTAS), which is available from International Business Machines Corporation. When partitions 303, 305, 307, and 309 are instantiated, a copy of boot strap code is loaded onto partitions 303, 305, 307, and 309 by platform firmware 310. Thereafter, control is transferred to the boot strap code with the boot strap code then loading the open firmware and RTAS. The processor associated or assigned to the partitions are then dispatched to the partition's memory to execute the partition firmware.

Partitioned hardware 330 includes a plurality of processors 332-338, a plurality of system memory units 340-346, a plurality of input/output (I/O) adapters 348-362, and a storage unit 370. Each of the processors 332-338, memory units 340-346, NVRAM storage 398, and I/O adapters 348-362 may be assigned to one of multiple partitions within logically partitioned platform 300, each of which corresponds to one of the operating system images 302, 304, 306, and 308.

Partition management firmware 310 performs a number of functions and services for partitions 303, 305, 307, and 309 to create and enforce the partitioning of logically partitioned platform 300. Partition management firmware 310 is a firmware implemented virtual machine identical to the underlying hardware. Thus, partition management firmware 310 allows the simultaneous execution of independent operating system images 302, 304, 306, and 308 by virtualizing all the hardware resources of logically partitioned platform 300.

Service processor 390 may be used to provide various services, such as processing of platform errors in the partitions. These services also may acts as a service agent to report errors back to a vendor, such as International Business Machines Corporation. Operations of the different partitions may be controlled through a hardware management console 380. Hardware management console 380 is a separate data processing system from which a system administrator may perform various functions including reallocation of resources to different partitions and other manual configurations of elements of the logically partitioned platform 300.

Figure 4:
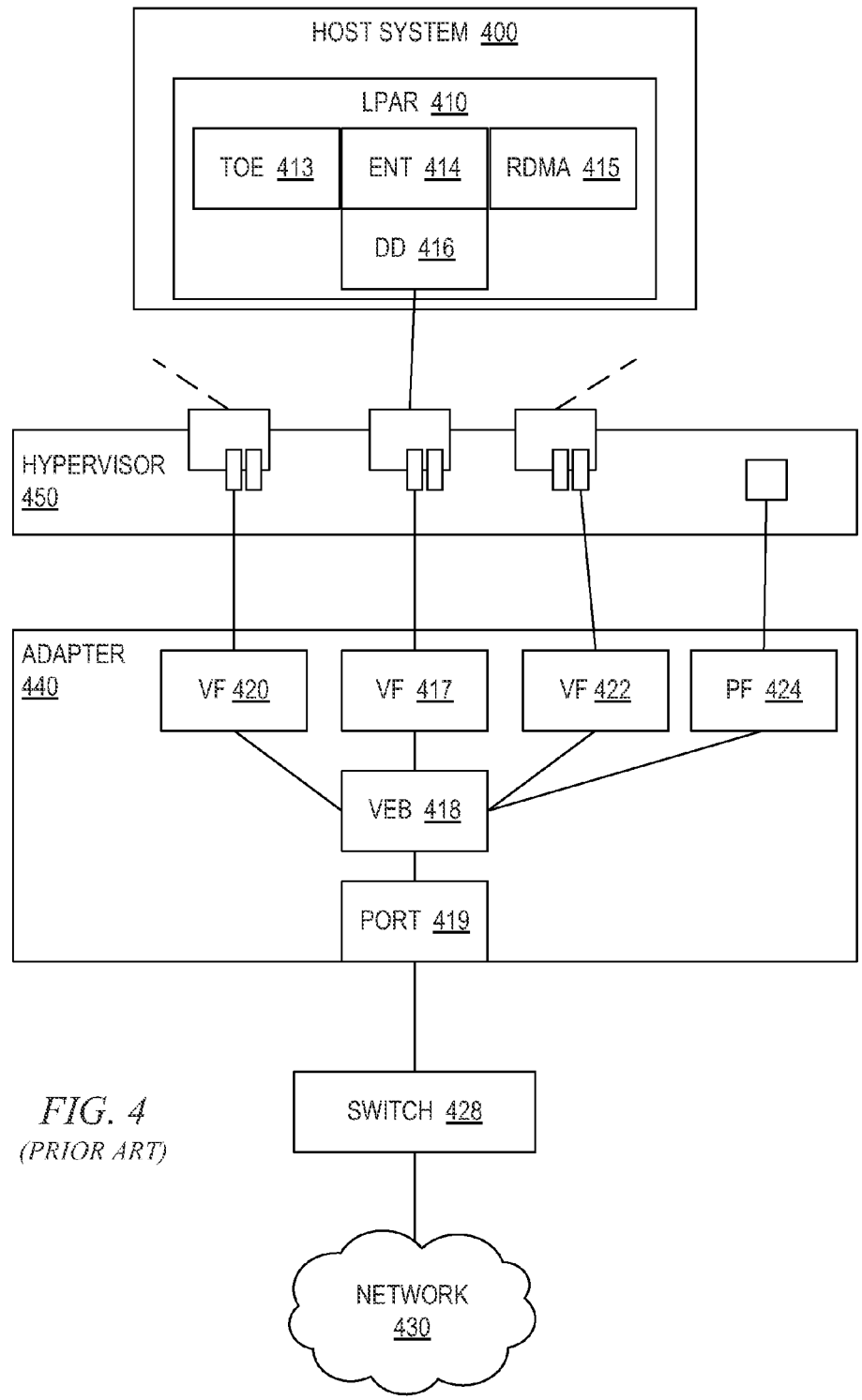
FIG. 4 is an example block diagram of the operational elements for performing communication between a logical partition of a host system and a network switch as is generally known in the art.

FIG. 4 is an example block diagram of the operational elements for performing communication between a logical partition of a host system and a network switch as is generally known in the art. As shown in FIG. 4, The host system 400 includes one or more logical partitions (LPARs) 410, each having an operating system image 411 associated application instances 412, and the like. In addition, the LPAR 410 may include a TCP offload engine (ToE) 413, Ethernet interface (Ent) 414, remote direct memory access (RDMA) interface 415, and device driver (DD) 416. The ToE 413 and RDMA interface 415 may be implemented as software device drivers for the underlying hardware logic. The hardware and network layer 3-4 logic is resident inside the adapter for these elements 413 and 415, which are stateful offload. The Ent 414 uses the traditional layer 3-4 logic inside of the OS communications stack. The ToE 413 is used to offload processing of the TCP/IP stack from the I/O adapter. The Ent 414 is used to perform Ethernet communications between the logical partition 410 and the network 430. The RDMA interface 415 provides for direct memory access from a memory of the host system 400 to the memory of another data processing system (not shown) without intervention by the operating system image 411.

As shown in FIG. 4, in order to perform communication between the logical partition 410 and another data processing system (not shown) via the network 430, the Ethernet interface (Ent) 414 communicates with a device driver (DD) 416 which in turn communicates with a virtual function (VF) 417 of the adapter 440 which in the depicted example is a hypervisor. The VF 417 communicates with the virtual Ethernet bridge (VEB) 418 to communicate with physical port 419 of the adapter 440. The physical port 419 provides a communication connection with network switch 420 which ultimately connects to the network 430.

The adapter 440 may comprise multiple virtual functions (VFs) 417 and 420-422, as well as a physical function (PF) 424, as is generally known in the art with regard to the Peripheral Component Interconnect (PCI) Express specification available from the PCI-SIG. The virtual Ethernet bridge (VEB) 418 may provide a switching function amongst the VFs 417 and 420-422 as well as the PFs 424. Each of the VFs 417 and 420-422 may be associated with a different logical partition of the same or different host system 400, applications within different logical partitions of the same or different host system 400, or the like.

As shown in FIG. 4, in a case where there is a one-to-one relation between the VF 417 instance and the physical network port 419, i.e. a single VF does not share multiple network ports 419, no aggregation is present. Thus, the network adapter 440 would provide a single point of failure in the event of link loss or network outage.

Figure 5:
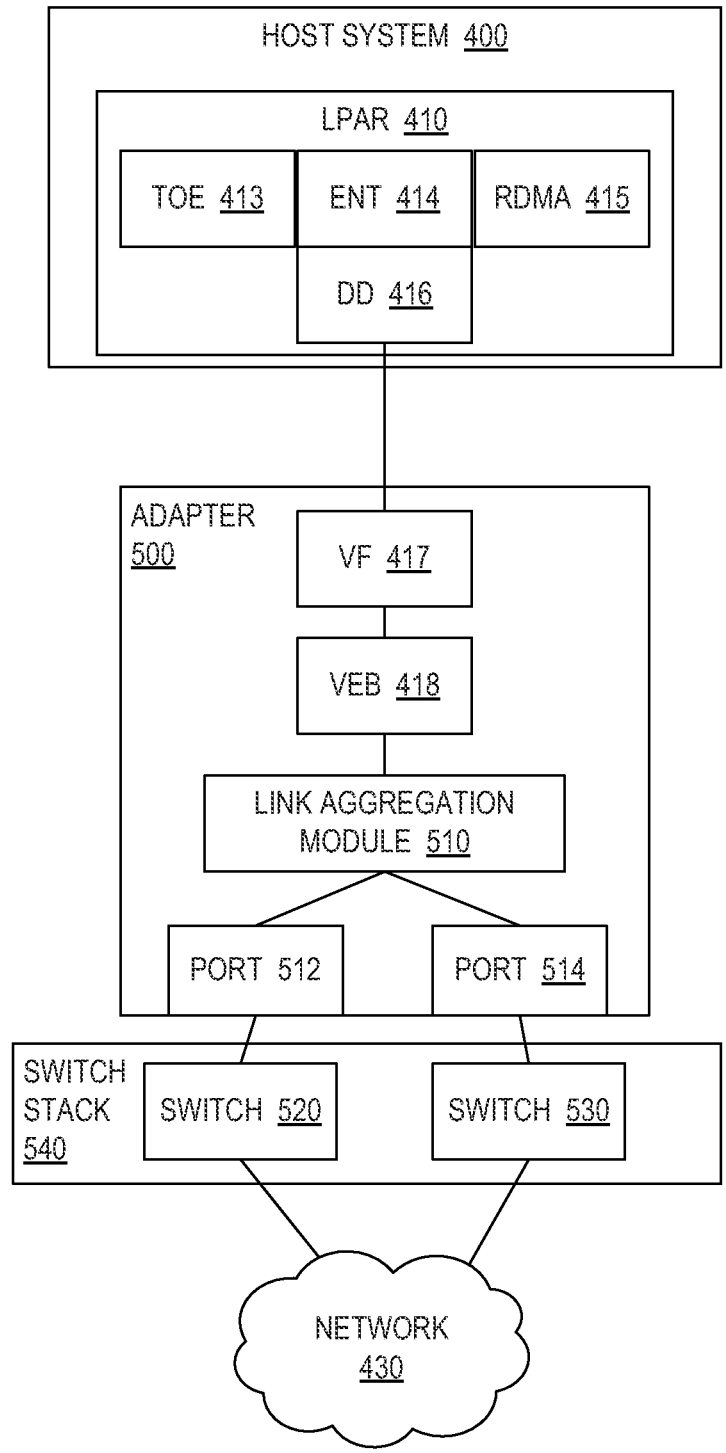
FIG. 5 illustrates an example block diagram of the operational elements for performing communication between a logical partition of a host system and a network using link aggregation support in the network adapter in accordance with one illustrative embodiment.

FIG. 5 illustrates an example block diagram of the operational elements for performing communication between a logical partition of a host system and a network using link aggregation support in the network adapter in accordance with one illustrative embodiment. Elements shown in FIG. 5 that are similar to the elements of FIG. 4 are shown with similar reference numerals. FIG. 5 presents a similar scenario to that of FIG. 4 but with an abstracted physical interface to the virtual Ethernet bridge (VEB) 418 via the link aggregation module 510 of the network adapter 500. The link aggregation module 510 may be implemented as hardware, software, or any combination of hardware and software. In one illustrative embodiment, the link aggregation module 510 is implemented as firmware in the network adapter 500 and comprises logic that virtualizes the connection between the VEB 418 and the physical network ports 512 and 514 of the network adapter 500 such that the link aggregation module 510 hides the fact that there are multiple physical network ports 512 and 514 in use by the VEB 418. As a result, higher reliability is achieved with regard to network outages since more than one physical port may be used by the VEB 418 rather than the single port 419 in FIG. 4.

Thus, as shown in FIG. 5 communication between the logical partition 410 and the network 430 via the switches 520 and 530 in switching stack 540 may be achieved via the link aggregation module 510 and multiple network ports 512 and 514. In other words, link failure issues are reduced due to multiple redundant physical links. The link aggregation module 510 performs all of the necessary negotiations to associate the physical network ports 512 and 514 with the virtual function (VF) 417. Thus, link aggregation is performed entirely within the network adapter 500 without intervention of the operating system 411 of the logical partition 400.

VEB 418 egress traffic is sent from the VEB 418 to the link aggregation module 510 of the network adapter 500 which in turn performs distribution of the traffic to the physical network ports 512 and 514. This distribution is performed by using a mapping/association data structure (not shown) that provides physical port associations between the ports 512, 514 and the virtual functions (VFs) 417. The link aggregation module 510 also performs verification of connectivity and identifies active/active and active/passive ports. With ingress traffic from the network 430, the traffic arrives through either of the physical network ports 512 and 514, via the associated switches 520 and 530, and the link aggregation module 510 performs LACP based operations for routing the traffic through the VEB 418 to the corresponding virtual function 417. Of course, the logic of the link aggregation module 510 may be implemented as hardware logic or software logic executed by a processor.

Thus, with the mechanisms of the illustrative embodiments, the LACP link aggregation operations are moved to a position within the network adapter 500 that is below the VEB 418 with regard to the host system 400, rather than at the operating system images of the various logical partitions 410 of the host system. Because of this, the interoperability issues associated with LACP and I/O virtualization using virtual Ethernet bridges (VEBs) are avoided. That is, as mentioned above, LACP is meant to be a point-to-point protocol. By introducing a VEB in the adapter (which is essentially a switch that is invisible to the external network and the VFs, the point-to-point concepts disappear and as a result, one gets the N to 1 LACP exchange problem where settings are being overwritten as discussed above. Moving the LACP to below the VEB, or in some illustrative embodiments inside of the VEB, allows for the LACP exchange to be one-to-one since there is a single negotiation on behalf of all of the VFs residing above the VEB. In such a case, the VFs do not need to be LACP aware since the LACP exchange is already taken care of outside of the VFs.

Moreover, this approach allows the exploitation of the excess bandwidth existing between the VF 417 and the VEB 418, which is in place to handle the combination of VF-to-VF and VF-to-physical network traffic. That is, the VF-to-VF communication over a VEB 417 or 418 is always over-provisioned by design, since the VEB 417, 418 needs to be able to handle the combined physical (external network-to-VF) and logical (VF-to-VF) communication. Communication between the VF to the VEB 417, 418 occurs at PCIe speeds which are several times higher than the physical network speed. This means that a single VF with LACP communication performed by the adapter has PCIe speeds to the VEB, and that traffic is then distributed at twice the port speed due to two ports being utilized. In this example there is a simplified interface since LACP is hidden and there is a high speed communication because the PCIe output is now handled by multiple physical ports.

It should be noted that in FIG. 5, the network adapter 500 remains a single point of failure even though there is now link protection provided through the link aggregation performed by the link aggregation module 510 of the network adapter 500. That is, using the link aggregation module 510, redundancy between the physical network ports 512 and 514 is made possible such that if a corresponding switch 520, for example, associated with a network port 512 fails, then another switch 530 may be used to route data to/from redundant port 514. However, if the network adapter 500 as a whole fails, then there is no failover possibility in the configuration shown in FIG. 5.

Figure 6:
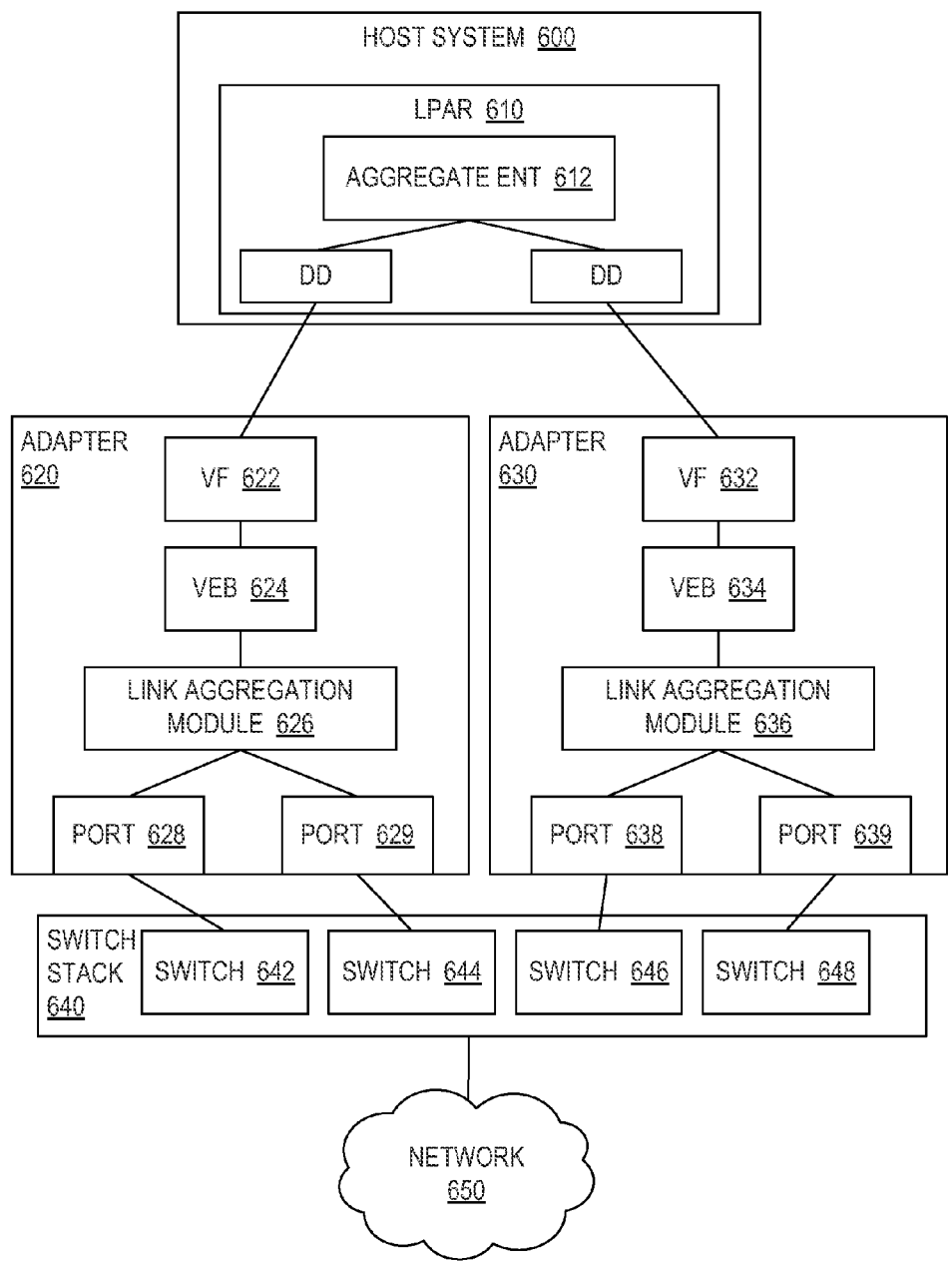
FIG. 6 is an example block diagram of the primary operational elements for performing data communication between a logical partition of a host system and a network using multiple network adapters in accordance with one illustrative embodiment.

FIG. 6 is an example block diagram of the primary operational elements for performing data communication between a logical partition of a host system and a network using multiple network adapters in accordance with one illustrative embodiment. As shown in FIG. 6, there are multiple network adapters 620 and 630 provided between the host system's logical partition 610 and the network switches 642-648 of the switch stack 640. Each network adapter 620 and 630 implements link aggregation module 626 and 636 similar to link aggregation module 510 of FIG. 5. The mechanisms shown in FIG. 6, however, further include aggregate Ethernet interface module 612 which operates in the logical partition 610 to provide a second level of aggregation which aggregates the physical network adapters 620 and 630 such that the logical partition 610 sees only one virtual network. This second level of aggregation is a bonding of both VFs by abstracting them with a higher level device driver which provides an Ethernet interface. The aggregation may be similar to the aggregation performed in the adapter 620, 630 but with regard to VFs rather than physical ports.

Thus, the physical links associated with a network adapter 620 and 630 may be aggregated using the link aggregation module 626, 636 within the network adapters 620, 630 to thereby allow LACP operations to be performed with IOV enabled network adapters 620 and 630. In addition, the network adapters 620 and 630 may be aggregated by the aggregate Ethernet interface module 612 so that the logical partition 610 sees only a single virtual network adapter. Thus, from the view point of the logical partition 610, the configuration of the operational elements appears to be as shown in FIG. 4.

Not only do the mechanisms of the illustrative embodiments allow aggregation of multiple links within the network adapters 620 and 630, as well as aggregation of the network adapters 620 and 630 themselves, but the mechanisms further increase availability and bandwidth over known one-to-one VF-to-adapter port mechanisms. That is, the total bandwidth of a network adapter can be calculated as using the relationship: VFs*(ports per VF)*media_speed. Assuming a same media_speed between the configurations of FIGS. 4 and 6, the total bandwidth of the configuration in FIG. 4 is 1*1*media_speed=1 media_speed. The total bandwidth of the configuration in FIG. 5 is 1*2*media_speed=2 media_speed, i.e. a doubling of the bandwidth. The total bandwidth of the configuration of FIG. 6 is 2*2*media_speed=4 media_speed, i.e. a quadrupling of the bandwidth.

Similarly, the recoverable link failures of a configuration may be calculated as recoverable link failures=ports per VF−1. Thus, the recoverable link failures for the configuration in FIG. 4 is 1−1=0, i.e. no recoverable link failures. The recoverable link failures for the configuration in FIGS. 5 and 6 is 2−1=1, i.e. the configuration can recover from a single link failure.

Furthermore, the recoverable adapter failures may be calculated as the total number of VFs−1. Thus, the recoverable adapter failures for the configuration in FIGS. 4 and 5 is 1−1=0, i.e. the configuration cannot recover from any adapter failures. The recoverable adapter failures for the configuration of FIG. 6 is 2−1=1, i.e. the configuration can recover from a single adapter failure. Thus, the mechanisms of the illustrative embodiments increase both the bandwidth and recoverability of the system by providing the link and adapter aggregation capabilities described above.

Figure 7:
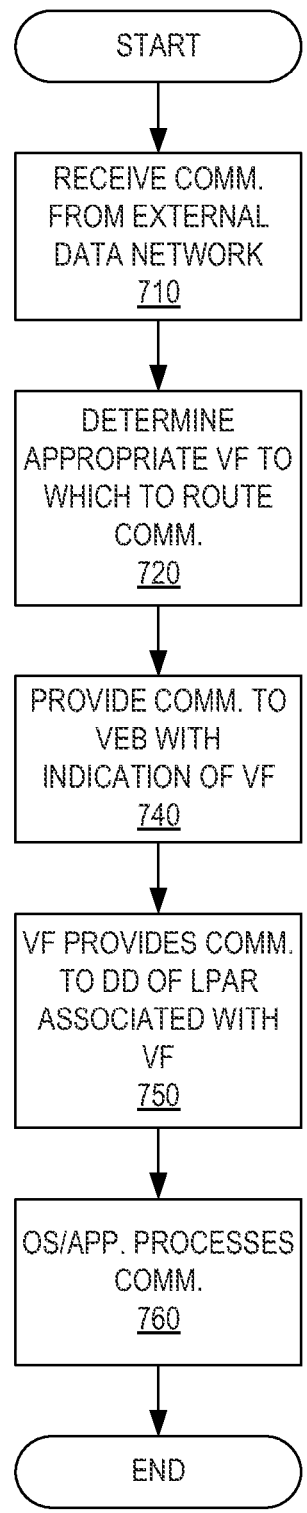
FIG. 7 is a flowchart outlining an example operation for processing an ingress communication using link aggregation in a network adapter in accordance with one illustrative embodiment.

FIG. 7 is a flowchart outlining an example operation for processing an ingress communication using link aggregation in a network adapter in accordance with one illustrative embodiment. As shown in FIG. 7, the operation starts by receiving, via a physical port of a network adapter, a communication from an external data network (step 710). The link aggregation module logic of the network adapter determines an appropriate virtual function to which to route the communication (step 720). This determination may be made based on a mapping/association data structure maintained by the link aggregation module for use in aggregating physical ports of the network adapter, for example. The mapping/association data structure may map virtual functions to physical ports and may further include additional information that may be necessary for identifying which virtual function to which traffic is to be routed when received from particular physical ports, e.g., logical partition identifiers or other information that may be matched with information in headers of communications to identify a target of the communications. As mentioned above, a virtual function may be associated with multiple physical ports and each physical port may be associated with multiple virtual functions of the adapter.

The link aggregation module then provides the communication to the VEB with an indication of the VF to which the communication is to be routed (step 730). The VEB routes the communication to the identified VF (step 740) which then provides the communication to an appropriate device driver of a logical partition associated with the VF, via an I/O virtualization intermediary, e.g., a hypervisor or the like (step 750). The communication is then processed by the operating system and/or other target application of the communication (step 760). The operation then terminates.

Figure 8:
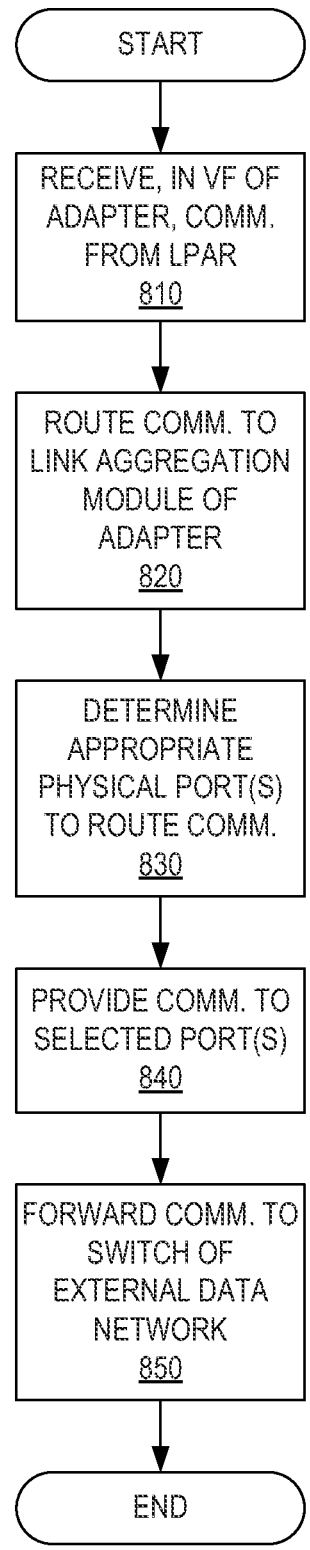
FIG. 8 is a flowchart outlining an example operation for processing an egress communication using link aggregation in a network adapter in accordance with one illustrative embodiment.

FIG. 8 is a flowchart outlining an example operation for processing an egress communication using link aggregation in a network adapter in accordance with one illustrative embodiment. As shown in FIG. 8, the operation starts with the receipt of a communication from a logical partition in a virtual function of the adapter (step 810). The communication is routed from the virtual function through a VEB to the link aggregation module logic of the network adapter (step 820). The link aggregation module logic determines an appropriate physical port, or ports, to which to send the communication (step 830).

This determination may be made based on a mapping/association data structure maintained by the link aggregation module for use in aggregating physical ports of the network adapter, for example. The mapping/association data structure may map virtual functions to physical ports and may further include additional information that may be necessary for identifying which virtual function to which traffic is to be routed when received from particular physical ports, e.g., logical partition identifiers or other information that may be matched with information in headers of communications to identify a target of the communications. As discussed above, a virtual function may be associated with a plurality of physical ports through this link aggregation. The determination of an appropriate physical port(s) to which to send the communication may further include a determination as to whether any of the physical ports with which the virtual function is associated is in an inoperable state, or an external switch port to which the physical port of the adapter is coupled is in an inoperable state. If a physical port is inoperable, or a switch port is inoperable, then the associated physical port is not selected for transmission of the communication.

The link aggregation module then provides the communication to the selected physical port, or ports (step 840). The physical port then forwards the communication to an associated external switch port of a switch associated with an external data network (step 850). The operation then terminates.

Thus, the illustrative embodiments provide a mechanism for performing automatic link aggregation within a network adapter rather than requiring manual link aggregation at the operating system level. While the above illustrative embodiments are described as having a separate link aggregation module within the network adapter, the illustrative embodiments are not limited to such. Rather, the logic and functionality of the link aggregation module may be integrated into other logic or modules of the network adapter. For example, the link aggregation module may be integrated into the VEB of a network adapter.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a network adapter, for processing traffic, comprising:

receiving traffic in the network adapter from either a host system or an external data network;

providing the traffic to a link aggregation module of the network adapter, either via a virtual Ethernet bridge (VEB) or a physical network port, in a plurality of physical network ports, of the network adapter, wherein the link aggregation module logically aggregates a plurality of links into a single virtual link from a perspective of the VEB and each physical network port of the plurality of physical network ports;

determining a route for the traffic either to a virtual function of the network adapter or a physical network port of the adapter based on a link aggregation data structure maintained by the link aggregation module of the network adapter; and routing the traffic to either the virtual function or the physical network port based on the determined route, wherein the network adapter implements a plurality of virtual functions, each virtual function being associated with a logical partition of one or more host systems, and wherein each of the virtual functions is mapped to one or more of the physical network ports of the network adapter via the link aggregation data structure of the link aggregation module.

2. The method of claim 1, wherein determining a route for the traffic further comprises performing, by logic of the link aggregation module, link aggregation control protocol (LACP) operations to aggregate the links associated with the plurality of physical network ports.

3. The method of claim 1, wherein the link aggregation module operates within the network adapter to determine a route for the traffic without intervention by operating systems of logical partitions of one or more host systems coupled to the network adapter.

4. The method of claim 1, wherein egress traffic is sent from the VEB to the link aggregation module of the network adapter, and wherein the link aggregation module performs distribution of the egress traffic to the plurality of physical network ports based on the link aggregation data structure which maps virtual functions of the network adapter to one or more physical network ports of the plurality of physical network ports.

5. The method of claim 1, wherein ingress traffic from an external data network is received through one of the plurality of physical network ports and provided to the link aggregation module, and wherein the link aggregation module performs link aggregation control protocol (LACP) operations on the ingress traffic to route the traffic through the VEB to corresponding virtual functions of the network adapter.

6. The method of claim 1, wherein the link aggregation module aggregates physical ports of the network adapter to represent the plurality of physical network ports to the virtual functions of the network adapter as a single physical port.

7. The method of claim 1, wherein the network adapter is one of a plurality of network adapters coupled to the host system, each network adapter in the plurality of network adapters implementing the method, wherein the method further comprises:

executing, in the host system, a network adapter aggregation module which aggregates the network adapters of the plurality of network adapters to represent the plurality of network adapters to a logical partition of the host system as a single network adapter.

8. The method of claim 1, wherein the link aggregation data structure comprises a mapping of logical partition identifiers to virtual functions for routing of traffic from a physical network port of the network adapter to a corresponding virtual function based on the mapping of logical partition identifiers to virtual functions.

9. The method of claim 1, wherein the link aggregation module utilizes the link aggregation data structure to identify a virtual function corresponding to a header of a received communication received via a physical port of the network adapter and provides the communication to the virtual Ethernet bridge along with an indication of the virtual function to which the communication is to be routed.

10. The method of claim 1, wherein the link aggregation module receives communications from the virtual functions via the virtual Ethernet bridge and identifies a corresponding physical port in the plurality of physical ports to which to route the communications based on the link aggregation data structure.

11. The method of claim 10, wherein the link aggregation module further determines if a physical port associated with the virtual function is inoperable and identifies a corresponding physical port in the plurality of physical ports to which to route the communications based on results of determining if the physical port associated with the virtual function is inoperable.

* * * * *